Feb. 23, 1965 H. M. WILLIAMS 3,170,235

METHOD OF FABRICATING A CONNECTING DEVICE

Filed Sept. 15, 1958 2 Sheets-Sheet 1

INVENTOR.
HENRY M. WILLIAMS
BY
Lionel E. Goff
ATTORNEYS

INVENTOR.
HENRY M. WILLIAMS
BY
Lionel E. Goff
ATTORNEYS

United States Patent Office
3,170,235
Patented Feb. 23, 1965

3,170,235
METHOD OF FABRICATING A CONNECTING DEVICE

Henry M. Williams, Alton, Ill., assignor to Olin Mathieson Chemical Corporation, East Alton, Ill., a corporation of Virginia Filed Sept. 15, 1958, Ser. No. 760,998
8 Claims. (Cl. 29—534)

This invention relates to a connecting means and more particularly to a connecting means of the bayonet type for engagement into slots of supporting structures.

Bases of the bayonet type for electrical bulbs generally comprise a cupped cylinder provided with circular openings in the closed end thereof, with pins projecting outwardly and radially from the outer wall of the base. Generally, the closed end of the base has one or two openings which are sealed by fuzed glass bodies in which are embedded contact plates in insulating relationship to the base. However, the closed end of the base may be provided with any number of openings depending on the number of contacts desired. The contact plates are provided for attachment to a source of electric current and to the filament which translates the electrical energy to light. The open end is adapted to receive, in hermetically sealed relationship, a glass envelope which encases the filament.

Heretofore, one method of fabricating bayonet type bases, for electrical bulbs, comprises providing in the side wall of the fabricated tubular base a plurality of openings into which are inserted small cylindrical rods. These rods may be secured in various manners to the base proper outwardly from the wall of the base. This method has the disadvantage in requiring the handling of very small cylindrical rods and also requiring an additional step of permanently securing them to the base. Despite the manner employed in securing the pins, or rods, to the base, they often become dislodged with resultant difficulties in attempting to connect the base into the socket for which they are intended. Dislodgment of these pins often prevents a positive contact of the base to a source of electrical energy.

Another method of fabricating bases of the bayonet type comprises deforming the metal of the base, by stamping, into pins having the shape of the desired configuration, either prior or subsequent to the fabrication of the tubular base. This method produces bayonet projections which have sharply angled pin protrusions. Since the metal employed in the fabrication of the bases is thin, such sharp defined angled configurations often cause break-offs and/or fractures of the pins with resultant malfunctioning upon insertion into sockets.

Accordingly, it is an object of this invention to provide a novel process for the manufacture of bayonet type projections which eliminates disadvantages of the prior art.

Another object of this invention is to provide a novel process for the fabrication of solid bayonet type projections which are integral with the base.

Still another object of this invention is to provide a novel process for the fabrication of bayonet type projections having sufficient strength and rigidity to withstand the most rigid handling without fracture or breakage.

The above objects are accomplished, in accordance with the invention, by extruding a mass of metal into a cupped cylinder with an extrusion punch, having appropriate indentations in its lower end, which provides a number of inwardly projecting nibs on the inner wall of the extruded article. In a succeeding operation the closed end may be provided with a plurality of openings, depending on the number of contact plates desired, by any conventional methods, as for example by a punching operation. The tubular article is then inserted into a female die provided with cavities at points, in the wall of the cavity, adjacent the nibs of the article. These cavities have the configuration of the desired bayonet type projecting pins which generally, will be that of radially extending cylindrical pins. The nibs are then extruded into the cavities of the female die whereby solid projecting bayonet type pins integral with the base are obtained.

Other objects and advantages of this invention will become more apparent from the following description and drawings in which.

Figure 1:
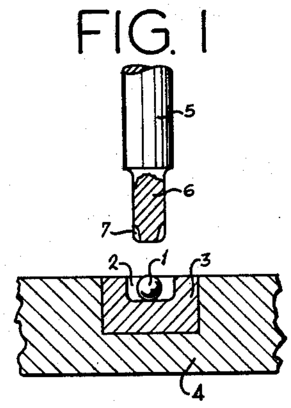
FIGURE 1 is an elevational view, in cross section, of an embodiment of the invention illustrating a die and an extrusion punch for the impact extrusion of a mass of metal.
Figure 2:
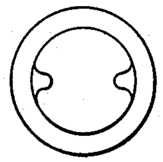
FIGURE 2 is a plan view of the bottom of the punch employed in FIGURE 1.

Referring to FIGURE 1, a mass of metal 1 is placed into a cylindrical cavity 2 of a female extrusion die 3 which is mounted in a base 4. An extrusion punch 5 suitably mounted in a conventional vertically reciprocating gate, not shown, has a working face 6 provided in the lower end thereof with indentations, or slots, 7. The depth and configurations of slots 7 are determined by the shape of the nibs desired and the amount of metal to be extruded in a second, subsequent extrusion operation. Any metal capable of plastic flow by conventional extrusion processes is operative in the invention, as for example copper, brass, aluminum and its alloys, such as ASTM designated alloys 1100 and 2S. Although the mass of metal 1 depicted is of pellet form it is to be understood that other forms, such as discs and varied shaped slugs, are also operative in the process of this invention.

The working face 6 of extrusion punch 5 has an outer dimension which is equal to, or smaller than the inner dimension of the article to be extruded for the specific extrusion operation herein employed which is commonly known as "impact extrusion."

Figure 3:
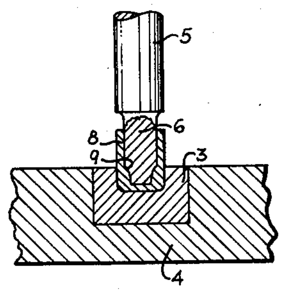
FIGURE 3 is an elevational view, in cross section, illustrating the position of the elements of FIGURE 1 upon completion of the extrusion process.
Figure 4:
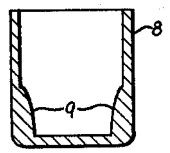
FIGURE 4 is an elevational view, in cross section, of the extruded article depicted in FIGURE 3.
Figure 6:
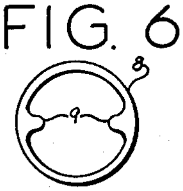
FIGURE 6 is a plan view of the extruded article obtained on completion of the extrusion operation shown in FIGURE 3.
Figure 7:
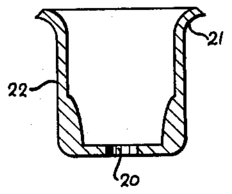
FIGURE 7 is an elevational view, in cross section, of the punched and deformed tubular article obtained in the operation of FIGURE 5.

In operation the punch 5 is brought down in compression against the mass of metal 1 to compress it within the cavity 2 thereby causing the metal to move in plastic flow back in a direction parallel to the working face 6 of punch 5 to form a cupped cylindrical article 8, as illustrated in FIGURE 3, having diametrically opposed nibs 9. In the instant embodiment, the working face 6 has been provided with two diametrically opposed indentations 7 which form, in the interior of article 8 two diametrically opposed nibs 9 protruding inwardly from the inner walls of the article, as illustrated in FIGURES 4 and 6. As will be understood, the numebr of indentations 7 to be employed in punch conforms to the number of bayonet type projections in the ultimate article. Since the number of bayonet type projections is generally two, only two indentations have been shown in punch 5. Further although an impact extrusion method has been described, it is to be understood that other extrusion methods which permit the functioning of extrusion punch 5 in their process may also be employed, as for example, the method described in U.S. Patent No. 2,630,916, issued to E. Blair, March 10, 1953.

Figure 5:
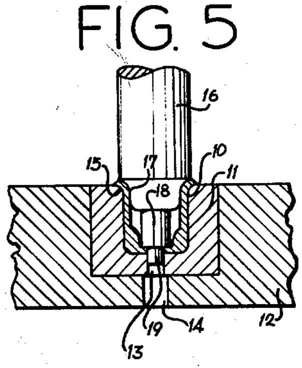
FIGURE 5 is an elevational view, partly in cross section, of an embodiment of the invention illustrating a punching and deforming operation on the article of FIGURE 4.

Article 8 may, if desired, at this stage be subjected to any suitable operation to provide circular openings in the closed end of the tube. Generally, the operation preferred is a punch operation such as illustrated in FIGURE 5. Article 8 is inserted into a cavity 10 of a punching die 11 mounted in a base 12. Die 11 is provided, at the bottom of the cylindrical cavity 10, with a bore 13 communicating with an opening 14 in base 12. The upper end of cavity 10 is provided with a flaring mouth 15. A punch 16 is mounted in a conventional vertically reciprocating gate, not shown, in cooperating relationship with die 11. Punch 16 is provided with a forming face 17 for cooperating relationship with the flaring mouth 15 of die 11. The forming face 17 reduces to a cylindrical gauging portion 18 having a greatly reduced outer dimension than that of the largest dimension of punch 16. Portion 18 is reduced to a cylindrical cutting portion 19 having a diameter equal to the opening desired in the closed end of article 8.

As punch 16 is brought down in the cooperating relationship with die 11, cutting portion 19 pierces the closed end of artcile 8 to form an opening 20 whereafter upon further descent of punch 16, the forming face 17 is brought into cooperating relationship with flaring mouth 15 of die 11 to flare the open end of article 8 at 21 thereby producing the semi-finished article 22.

Although a flaring operation has been included in the aforedescribed process, it is to be understood that this flaring operation may be omitted by eliminating the forming face 17 of punch 16 and the flaring mouth 15 of die 11. The provision of a portion 18 in punch 16 is optional and may be omitted if desired by machining it to the same dimension as cutting portion 19. However, if it is employed, the diameter of portion 18 should not be so large as to interfere with or deform nibs 9 in the interior of the extruded article. As described, the length of portion 18 is employed as a gauging means to prevent excess deformation of the flared portion 21 of semi-finished article 22. Such gauging action is attained by the arresting of the shoulder formed by the portions 18 and 19 against the closed end of article 8 on the base of cavity 10 of die 11. It is to be understood that although the instant punching operation is described with reference to a single circular opening of the closed end of the article, a plurality of openings may be provided merely by increasing the number of cutting portions 19 on punch 16. Irrespectvie of the number of openings provided in the closed end of the intermediate article 22, the invention is unchanged.

Semi-finished article 22 is then seated, in inverted relationship, on a spreading punch assembly 23 which is mounted in base 24. Assembly 23 comprises a sub-base 25, which although is illustrated as square, may have any convenient configuration. Extending upwardly from base 25 is a cylindrical seat 26 provided with a kerf 27 extending from the top of the seat to the base 25. The lower portion of seat 26 has a flaring portion 29 which merges with base 25 and conforms to the configuration of flaring portion 21 of article 22. Pivotally mounted on pins 28 in kerf 27 and in back to back relationship to each other are a pair of extrusion rams 30 having a working portion 31 positioned opposite nibs 9. In addition to providing for the mounting of rams 30, kerf 27 serves an additional function in positioning article 22 which is accomplished by the action of kerf 27 as a cooperating slot for the engagement of nibs 9. When article 22 is placed on seat 26 out of position, nibs 9 will ride on the top of seat 26. By rotating article 22 about seat 26 nibs 9 will eventually engage kerf 27 permitting article 22 to drop for proper engagement on seat 26.

Mounted above assembly 23 in cooperating relationship is a female die 32 provided with diametrically opposed cylindrical cavities 33 extending radially and inwardly in the wall of cavity 34 of the die. Die 32 has a flaring mouth 35 and opening 36 for cooperating engagement of a punch 37. Die 32 is mounted in any convenient vertically reciprocating gate 38 which will lower die 32 into engagement with assembly 23 to position cavities 33 opposite nibs 9 on article 22. Gate 38 is also provided with an opening 39 for cooperating relationship with the punch 37. As illustrated, die 32 may be a split die to facilitate the disengagement of the female die from the completed article after extrusion of the desired bayonet type projection.

Mounted above the aforedescribed assembly is a vertically reciprocating punch 37 in cooperating relationship for engagement through opening 39 in gate 38, and opening 36 in die 32, into kerf 27 of assembly 23. Extending from the lower end of punch 37 is a flat sided pointed projection 40, the flat sides of which are positioned parallel to the wall of kerf 27. Portion 40 has a width which will permit free engagement of it into the aforesaid kerf.

In operation, die 32 is seated in engagement over article 22 which in turn is seated on assembly 23. As noted above the position of die 32 is such that cavities 33 are located adjacent the outer wall of article 22 at points opposite nibs 9. After positioning of die 32 punch 37 is lowered through openings 39, 36 into kerf 27 forcing point 40 between extrusion rams 30 to forcibly separate them. The result of this separation forces the working portions 31 of rams 30 against nibs 9 to extrude the metal of the nibs into the cylindrical cavities 33 of die 32. This extrusion results in solid bayonet type projections 41 in article 22 which are integral with the article without leaving any weakened portions with attending possibilities of rupture and/or breakage regardless of the hard usage to which it may be subjected.

It is to be understood that modifications are possible in the above described second extrusion operation. For example, the dimensions of punch 37 may be such that rams 30 will not deform the metal of nibs 9 in the article to a dimension providing, at the point of deformation, a diameter greater than the internal diameter of the wall proper of the article, or the dimensions of punch 37 may be such as to leave a thick portion 55 to provide a thicker wall for reinforcement of the article at the point at which the bayonet type projections are located.

Figure 12:
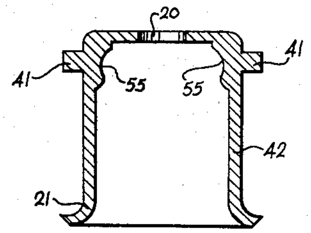
FIGURE 12 illustrates the finished article obtained on the completion of the extrusion step shown in FIGURE 11.

The finished article 42 illustrated in FIGURE 12 is now ready for subsequent and conventional operation in the assembly of various types of electrical bulbs for flashlights, photoflash, automobile lights, or as bases for the ends of neon tubes. Although the invention has specific application in the fabrication of the bases of electrical bulbs, it is to be understood that the aforedescribed process is also applicable to the fabrication of other articles which embody projections of various cross-sectional configurations for use in connection assemblies.

Figure 10:
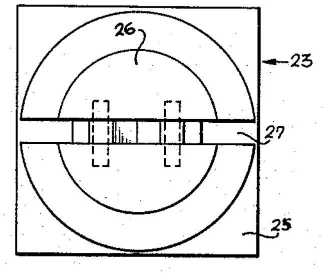
FIGURE 10 is a plan view of the spreading punch employed in FIGURE 8.
Figure 13:
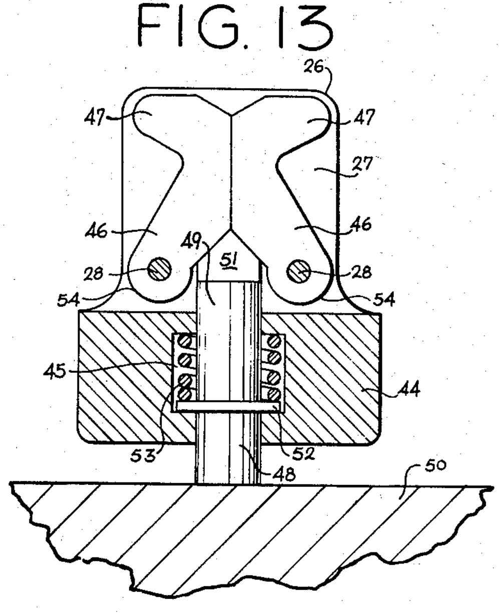
FIGURE 13 is an elevational view, partly in cross section, of another embodiment of a spreading punch that may be employed in the extrusion process of the invention.

Although the above has been described to the fabrication of article 42 having a single opening 20, FIGURE 13 illustrates a different embodiment of the assembly 23 of FIGURE 10, in the fabrication of articles having a plurality of openings in the closed end for multiple contact type bases, which may be substituted in the above described operation. This assembly, identified as 43, has a base 44 provided with a chamber 45. Extending from base 44 is a seat 26 provided with a kerf 27 similar to that of the preceding embodiment. Mounted within kerf 27 on pins 28 are extrusion rams 46 having working portions 47. Extrusion rams 46 are provided with a circular portion 54 which permit the rotation of rams 46 about pins 28 free of contact with punch 49. Base 44 is provided with a bore 48 extending from the bottom of the base to kerf 27 through chamber 45. A punch 49 mounted on a base 50 extends, in slidable engagement, through bore 48 and has a pointed portion 51 adjacent extrusion rams 46. The movement of punch 49 in bore 48 is limited by a radial shoulder, or flange, 52 fixedly mounted about the portion of the punch within chamber 45. A resilient means 53, such as a coil spring, in chamber 45 is slidably mounted in compression about punch 49 to urge shoulder 52 against the bottom of the chamber 45.

Figure 8:
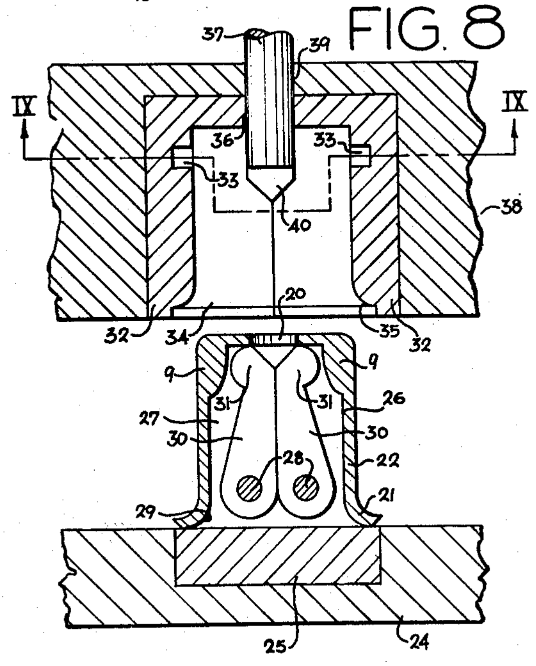
FIGURE 8 is an elevational view, partly in cross section, illustrating an embodiment of the extrusion apparatus that may be employed in the fabrication of the bayonet type projections of this invention.
Figure 9:
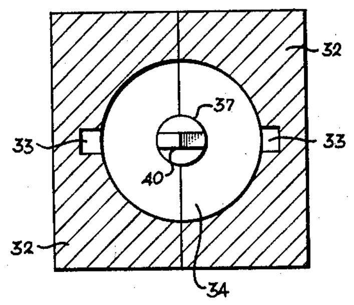
FIGURE 9 is a view taken along lines IX—IX of FIGURE 8.
Figure 11:
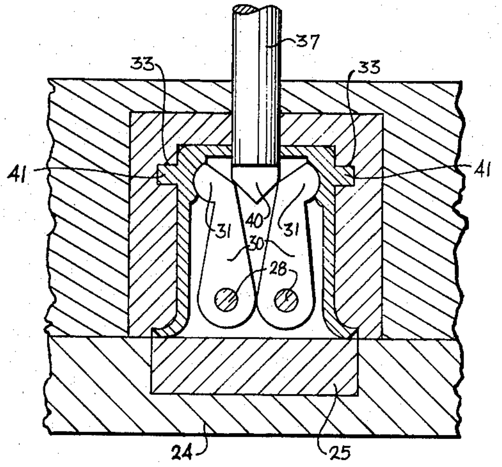
FIGURE 11 is an elevational view, partly in cross section, illustrating the structure of FIGURE 8 after completion of the extrusion operation.

In operation a cupped cylindrical article is seated on seat 26 having a pair of diametrically opposed nibs engaged in kerf 27. A female die 32 such as in FIGURE 8 is brought down by a vertically reciprocating gate on assembly 23 with a continued motion to force base 44 of assembly 43 downward toward base 50. This continued downward motion effects forcing punch 49 between extrusion rams 46 to force their working portions 47 against the nibs in an extrusion operation such as depicted and described with reference to FIGURE 11.

It is to be understood that assembly 43 of FIGURE 13 may be substituted if desired, for the assembly 23 of FIGURES 8 and 10. Assembly 43 of FIGURE 13 permits the fabrication of the bases having the closed end unperforated, or for subsequent punching operations in the formation of openings for contact plates.

It is to be understood that various other modifications of the invention are possible. Accordingly, although the invention has been described with reference to specific embodiments, materials and details, various modifications and changes will be apparent to one skilled in the art and are contemplated to be embraced within the invention.

What is claimed is:

1. A method of fabricating bases for connectors having a radially projecting pin forming part of a bayonet type connection comprising extruding metal into a thin-wall cupped cylinder with at least one nib projecting inwardly from and integral with the wall of said cylinder with said nib disposed adjacent the end-wall of said cylinder, and deforming a portion of said nib in a direction transverse said side wall to extrude the metal of said side wall into a lug projecting radially from the exterior of said cylinder on said side wall.

2. The method of claim 1 including perforating said end-wall to form at least one opening therethrough.

3. A method of fabricating bases for connectors having radially projecting pins forming part of a bayonet type connection comprising extruding metal into a thin-wall cupped cylinder with a plurality of circumferentially spaced nibs projecting inwardly from and integral with the side-wall of said cylinder with said nibs disposed adjacent the end-wall of said cylinder, forming at least one opening in the closed end of said cylinder, and deforming said nibs in a direction transverse said side-wall to extrude the metal of said side-wall into lugs projecting radially from the exterior of said cylinder on said side-wall.

4. A method of fabricating bases for connectors having at least one radially projecting pin forming part of a bayonet type connection comprising placing a mass of metal in the recess of a first female die, extruding said mass to form a thin-wall cupped cylinder with a male extrusion die provided with a notch in the lower end thereof adjacent its bottom to form a corresponding nib projecting inwardly from and integral with the side-wall of said cylinder with said nib disposed adjacent the end-wall of said cylinder, seating said cylinder in a second female die provided with a cavity in the wall thereof for said nib and at a point adjacent the portion of said side-wall opposite said nib of said cylinder, and deforming a portion of said nib in a direction transverse said side wall to extrude the metal of said side-wall into said cavity to form a corresponding radially projecting lug on said side-wall of said cylinder.

5. The method of claim 4 including perforating said end-wall to form at least one opening therethrough.

6. A method of fabricating bases for connectors having radially projecting pins forming part of a bayonet type connection comprising placing a mass of metal in the recess of a first female die, extruding said mass to form a thin-wall cupped cylinder with a male extrusion die provided with circumferentially spaced longitudinally extending notches in the lower end thereof adjacent its bottom to form corresponding nibs projecting inwardly from and integral with the side-wall of said cylinder in spaced relationship to each other and with said nibs disposed adjacent the end-wall of said cylinder, seating said cylinder in a second female die provided with cavities in the wall thereof at points adjacent the corresponding portions of said side-wall opposite said nibs of said cylinder, forming at least one opening in the closed end of said cylinder, and deforming said nibs in a direction transverse said side-wall to extrude the metal of said side-wall into said cavities to form radially projecting lugs on said side-wall of said cylinder.

7. A method of fabricating bases for connectors having radially projecting pins forming part of a bayonet type connection comprising placing a mass of metal in the recess of a first female, die, extruding said mass to form a thin-wall cupped cylinder with a male die provided with circumferentially spaced indentations in the lower end thereof adjacent its bottom to form corresponding nibs projecting from and integral with the side-wall of said cylinder with said nibs disposed adjacent the end-wall of said cylinder whereby said side-wall is provided with a uniform thickness except in the area of said nibs whereat said nibs form mounds of metal projecting inwardly in said cylinder, seating said cylinder in sliding engagement in a recess of a second female die provided with radially extending cylindrical cavities in the wall of said recess at points adjacent the portion of said side-wall opposite corresponding nibs of said cylinder, and deforming said nibs in a direction transverse said side-wall to extrude the metal of said side-wall into said cavities to form radially projecting lugs on said side-wall of said cylinder.

8. A method of fabricating bases for connectors having radially projecting pins forming part of a bayonet type connection comprising placing a mass of metal in the recess of a first female die, extruding said mass to form a thin-wall cupped cylinder with a male die provided with circumferentially spaced indentations in the lower end thereof adjacent its bottom to form corresponding nibs projecting inwardly from and integral with the side-wall of said cylinder with said nibs disposed adjacent the end-wall of said cylinder, seating said cylinder in sliding engagement in a recess of a second female die provided with radially extending cylindrical cavities in the wall of said recess at points adjacent the portion of said side-wall opposite corresponding nibs of said cylinder, forming at least one opening in the closed end of said cylinder, and deforming said nibs in a direction transverse said side-wall to extrude the metal of said side-wall into said cavities to form radially projecting lugs on said cylinder.

References Cited by the Examiner

UNITED STATES PATENTS

| | | | |
|---|---|---|---|
| 1,328,276 | 1/20 | Fuchs. | |
| 2,024,286 | 12/35 | Handler | 78—60 |
| 2,224,670 | 12/40 | Criley | 78—60 |
| 2,244,954 | 6/41 | Lenz et al. | |
| 2,677,118 | 4/45 | Stone | 339—144 |
| 2,733,419 | 1/56 | Beck | 339—144 |
| 2,764,810 | 10/56 | Gardiner | 29—534 |
| 2,795,467 | 6/57 | Colwell. | |
| 2,858,603 | 11/58 | Hermann | 29—534 |

FOREIGN PATENTS

| | | |
|---|---|---|
| 544,865 | 4/42 | Great Britain. |

WHITMORE A. WILTZ, *Primary Examiner*.

WILLIAM W. DYER, Jr., NEDWIN BERGER, ARTHUR M. HORTON, *Examiners*.